June 22, 1926.

W. T. MANNING

TRANSMISSION BAND

Filed April 29, 1924   2 Sheets-Sheet 1

1,590,104

William T. Manning.
INVENTOR

BY Victor J. Evans
ATTORNEY

WITNESS:

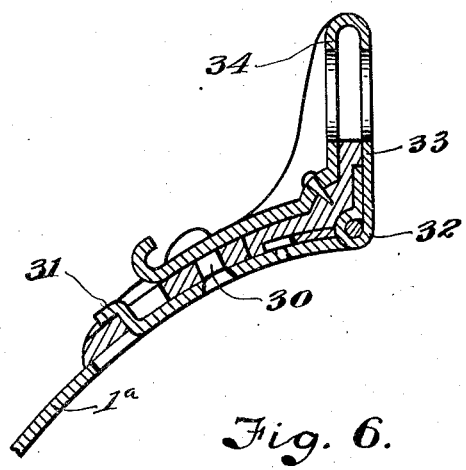
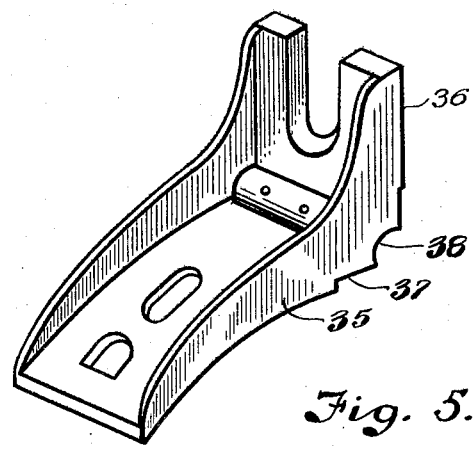
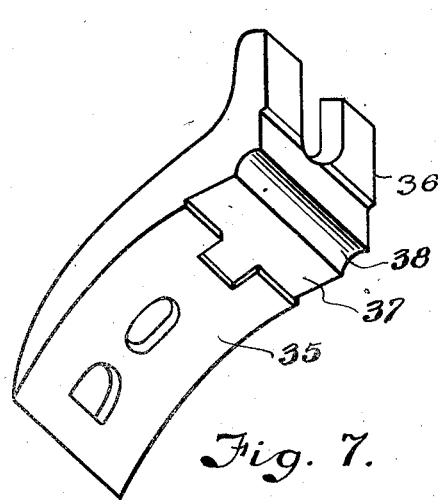
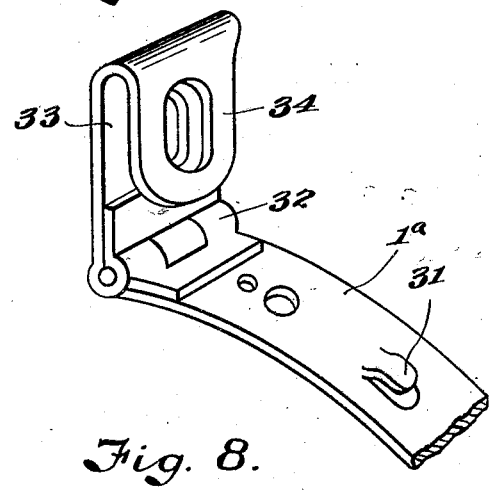

Patented June 22, 1926.

1,590,104

UNITED STATES PATENT OFFICE.

WILLIAM T. MANNING, OF PHILADELPHIA, PENNSYLVANIA, ASSIGNOR TO EDWARD KRAMER, OF PHILADELPHIA, PENNSYLVANIA.

TRANSMISSION BAND.

Application filed April 29, 1924. Serial No. 709,861.

This invention relates to transmission or brake bands, and the present invention relates particularly to a planetary type transmission for brake drum using bands and linings for obtaining speed or for braking speeds, and which linings necessitate replacement from time to time.

An object of the present invention is to provide a transmission or brake band which is constructed so that it can be easily taken out of the casing, relined and replaced by any one, any time, or at any place, without necessitating the service of a skilled mechanic or having the motor vehicle or transmission mechanism impaired or inoperative for any length of time, thereby causing a savings of a material amount of time and expense to the owner, or operator of the motor vehicle.

Another object of the invention is to provide a transmission or brake band structure which is of sturdy construction with removable end lugs or ears which can be disassembled in the containing housing or casing of the band in a minimum amount of time, thereby permitting the band to be lifted out, relined and replaced without disassembling the motor, transmission or other companion parts connected thereto, and a construction in which the ears when assembled to the band is substantially a solid ring held and locked in suitable manner, so as to prevent lateral or longitudinal movement or displacement of the ears with respect to the band, and thereby eliminating liability of displacement or accident.

Figure 1:
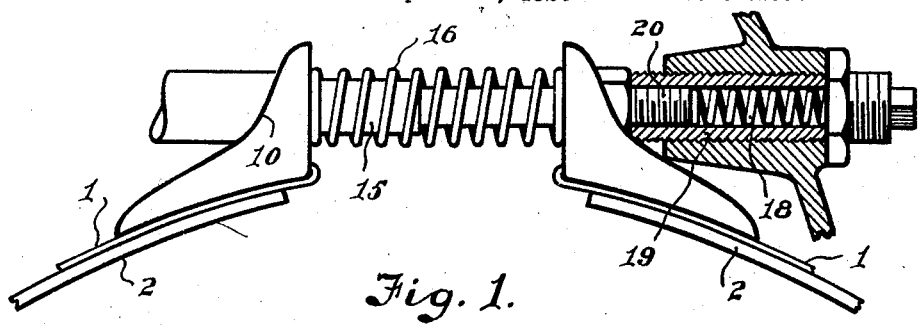

Other objects of the invention will appear in the following detail description, and in the accompanying drawings wherein:

Figure 1—is an edge elevation of a band constructed in accordance with this invention.

Figures 2, 3:
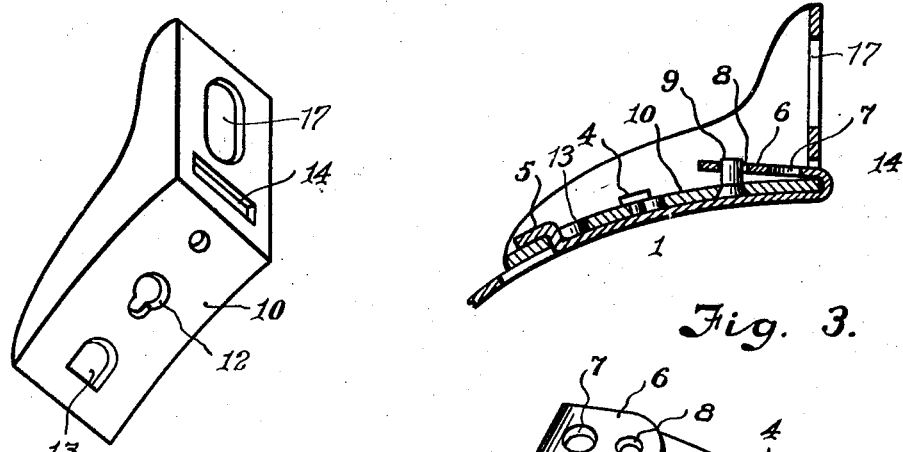

Figure 2—is a perspective view of one end of the brake band showing the removable ear thereon.

Figure 3—is a fragmentary longitudinal section through the ear and band.

Figure 4:
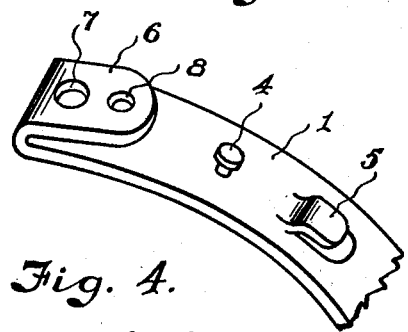

Figure 4—is a perspective view of one end of the band with the ear disconnected.

Figure 5—is a fragmentary side elevation of a modified form of the ear.

Figure 6—is a longitudinal section through the modified form.

Figure 7—is a detail perspective view of the modified form of ear.

Figure 8—is a detail perspective view of the modified form of band.

Figures 9, 10:
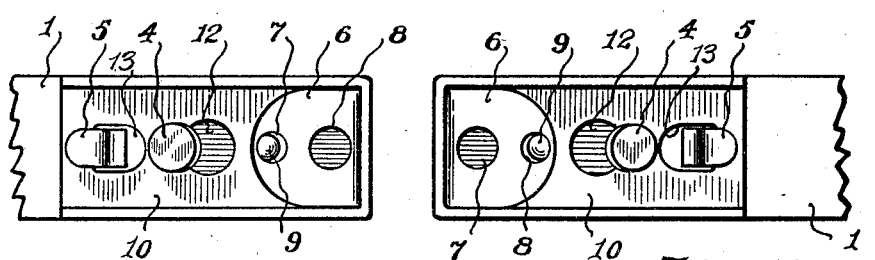

Figures 9 and 10—are top plans of the right and left ears.

Referring more particularly to the drawings, the improved brake or transmission band structure comprises the steel band 1 constructed of the usual material, and which has the lining 2 riveted thereto in the usual manner. The free ends of the band are identical in construction as are also the lug structures and in the following description only one of these ends and lugs will be described.

The band 1 has a headed pin 4 carried thereby a short distance inwardly from its free end and further inwardly from the headed pin is a tongue 5 which is struck outwardly from the band. The band has an extension 6 formed on its free end and bent back overhanging the band. The extension 6 is provided with spaced openings 7 and 8, the latter of which is adapted to engage over a pin 9 carried by the lug 10. The band engaging portion 11 of the ear 10 is provided with a keyhole slot 12 and with an elongated slot 13, which receives the headed pin 4 and the tongue 5 respectively, for providing slidable connection between the ear and band. The ear is provided with a transverse slot 14 at its outer end through which the turn-back extension 6 engages as clearly shown in Figure 2 of the drawings, and the pin 9 extends through the opening 8 in the extension for co-operating with the headed pin 4 and tongue 5 in securely locking the ear in position on the end of the band. The opening 7 in the extension 6 is provided to permit the passing of a rivet therethrough for riveting the end of the lining 2 to the band 1.

In assembling the band structure in position, the end of the usual low pedal shaft 15 is cut off substantially one inch which permits the spring 16 to be taken out of the slots 17 formed in the upright ends of the ear 10, thereby permitting the removal of the ears from the band and the removal of the band from the casing without taking the low pedal shaft out of the transmission case. After the bands have been properly installed, a relatively small coil spring 18 is placed in the opening or recess in the end of the adjusting screw 19 and the end of the shaft 15 is then inserted in the opening 20 and the adjusting screw against the spring 18, the latter spring compensating for the end of the shaft is also cut off. The coil spring 18 is also properly placed in position between the upright ends of the ears 10 and the adjusting screw is properly tightened for holding the various parts in position.

In the modified form, shown in Figures 5 to 8 inclusive, the band 1ª is provided with a headed pin 30 and a tongue 31 struck therefrom and it also has a hinge barrel 32 formed on its free end to which an extension 33 is provided with a downwardly extending portion 34 slightly nearer than the extension on the band and disposed in substantially parallel relation with the major portion of the extension. The extension and downwardly extending portion 33 are slotted to receive the proper shaft. The ear 35 is preferably cast and is provided with suitable slots in its arcuate band engaging portion for receiving the headed pin 4 and ear 5, and the outer corners at the lower end of the upstanding portion 36 and the band engaging arcuate portion 37 is cut away, as clearly shown at 38 to accommodate the hinged barrel, which serves to hingedly connect the extension to the band.

In operation, or in assembling the ear on the band, the extension 33 is moved substantially into longitudinal alignment with the band and the ear is placed with its upright portion 36 engaged between the extension and the substantially parallel projection on the extension after which the extension with the ear carried thereto is swung on its hinge to receive the headed pin and tongue through the respective openings. The lug is then moved outwardly towards the end of the band which securely connects the ear and band.

The assembling and disassembling of the modified form of the invention is the same as that for the preferred form as previously described.

While in the drawings in the foregoing description, the lugs have been shown and described as provided with two openings for receiving the tongue and headed pin, it is to be understood that one or more openings may be provided without departing from the spirit of this invention.

It is, of course, to be understood, that the invention may be constructed in various other manners and the parts associated in different relations, and therefore, I do not desire to be limited in any manner, except as set forth in the claims hereunto appended.

What I claim is:

1. In a brake or transmission band, the combination of a band, an extension on the end of said band, an ear provided with a slot for receiving said extension, a pin on the ear, said extension provided with an opening for receiving said pin for locking the ear to the band.

2. In a brake or transmission band, the combination of a band, an extension on the end of said band, an ear provided with a slot for receiving said extension, a pin on the ear, said extension provided with an opening for receiving said pin for locking the ear to the band, said lug provided with a plurality of elongated openings, and projecting members on said band for insertion through said openings and engagement with said ear.

3. In combination with a brake band of the character described, an ear consisting of a body and a face, the latter having a slot therein for the passage of a slip carried by the band, and means for removably holding the ear in place.

4. In combination with a brake band of the character described, an ear consisting of a body and a face, said face having a transverse slot therein for passage of a clip carried by the band, means for removably holding the ear in place, said face further provided with a longitudinally extending slot having its outer end closed.

5. In a brake or transmission band, the combination of a band, an ear comprising a body and a transversely extending face, an extension on the end of said band and bent back over the band, said face provided with a slot for receiving said extension therethrough, and a pin carried by the band for locking engagement with said extension.

In testimony whereof I affix my signature.

WILLIAM T. MANNING.